US012592412B2

(12) United States Patent　　(10) Patent No.:　US 12,592,412 B2
Kifune　　　　　　　　　　　　　(45) Date of Patent:　　　Mar. 31, 2026

(54) LITHIUM ION SECONDARY BATTERY AND METHOD FOR PRODUCING SAME

(71) Applicant: VEHICLE ENERGY JAPAN INC., Hitachinaka (JP)

(72) Inventor: Motonari Kifune, Hitachinaka (JP)

(73) Assignee: VEHICLE ENERGY JAPAN INC., Ibaraki (JP)

( * ) Notice: Subject to any disclaimer, the term of this patent is extended or adjusted under 35 U.S.C. 154(b) by 876 days.

(21) Appl. No.: 17/058,234

(22) PCT Filed: Feb. 25, 2019

(86) PCT No.: PCT/JP2019/007084
§ 371 (c)(1),
(2) Date: Nov. 24, 2020

(87) PCT Pub. No.: WO2019/244401
PCT Pub. Date: Dec. 26, 2019

(65) Prior Publication Data
US 2021/0194043 A1　　Jun. 24, 2021

(30) Foreign Application Priority Data
Jun. 19, 2018　(JP) ................................. 2018-116217

(51) Int. Cl.
*H01M 10/0525*　　(2010.01)
*H01M 4/04*　　　(2006.01)
(Continued)

(52) U.S. Cl.
CPC ..... *H01M 10/0525* (2013.01); *H01M 4/0471* (2013.01); *H01M 4/366* (2013.01); (Continued)

(58) Field of Classification Search
CPC ........... H01M 10/0525; H01M 50/586; H01M 4/0471; H01M 4/366
See application file for complete search history.

(56) References Cited

U.S. PATENT DOCUMENTS 5,834,052 A　　11/1998　Fukumura et al.
7,754,375 B2　　7/2010　Fujikawa et al.
(Continued)

FOREIGN PATENT DOCUMENTS

CN　　　104025342 A　　9/2014
JP　　　H09-223499 A　　8/1997
(Continued)

OTHER PUBLICATIONS

European Search Report issued on Jan. 27, 2022 for European Patent Application No. 19822194.7.
(Continued)

*Primary Examiner* — Olatunji A Godo
(74) *Attorney, Agent, or Firm* — Volpe Koenig

(57)　　　　　ABSTRACT

It is an object to provide a lithium ion secondary battery that ensures a replaceability of an electrolyte in a proximity of an active material and is excellent in output and responsiveness. The lithium ion secondary battery includes an electrode that includes a negative electrode foil, a negative electrode mixture layer disposed on a surface of the negative electrode foil, and an insulating layer disposed on a surface of the negative electrode mixture layer. The insulating layer contains ceramic particles. On the surface of the negative electrode mixture layer facing a border between the insulating layer and the negative electrode mixture layer, a plurality of holes (puddles) having diameters of 2.5 µm or more are provided.

15 Claims, 12 Drawing Sheets

(51) Int. Cl.
  *H01M 4/36* (2006.01)
  *H01M 4/48* (2010.01)
  *H01M 4/62* (2006.01)
  *H01M 50/586* (2021.01)
  *H01M 4/02* (2006.01)

(52) U.S. Cl.
  CPC ............. *H01M 4/48* (2013.01); *H01M 4/621* (2013.01); *H01M 50/586* (2021.01); *H01M 2004/021* (2013.01)

(56) References Cited

U.S. PATENT DOCUMENTS

| | | | |
|---|---|---|---|
| 2007/0072083 A1 | 3/2007 | Ikuta et al. | |
| 2010/0027193 A1* | 2/2010 | Marumo | H01G 11/50 |
| | | | 429/231.95 |
| 2012/0021264 A1 | 1/2012 | Morishima | |
| 2012/0115020 A1* | 5/2012 | Hwang | H01M 10/049 |
| | | | 429/163 |
| 2014/0308582 A1 | 10/2014 | Satow et al. | |
| 2015/0236318 A1 | 8/2015 | Katayama et al. | |
| 2017/0018761 A1* | 1/2017 | Ogino | H01M 4/625 |
| 2017/0309918 A1* | 10/2017 | Roumi | H01M 4/742 |
| 2018/0218963 A1* | 8/2018 | Hojo | H01L 23/3677 |
| 2018/0287215 A1* | 10/2018 | Matsui | H01M 10/0587 |

FOREIGN PATENT DOCUMENTS

| | | |
|---|---|---|
| JP | 51-12853 B2 | 1/2013 |
| JP | 2013-105680 A | 5/2013 |
| JP | 2017-216128 A | 12/2017 |
| JP | 2018-056022 A | 4/2018 |
| WO | 2015-045350 A1 | 4/2015 |
| WO | 2017-038327 A1 | 3/2017 |
| WO | 2018-003373 A1 | 1/2018 |
| WO | 2018-061479 A1 | 4/2018 |

OTHER PUBLICATIONS

Chinese Office Action issued on May 31, 2023 for Chinese Patent Application No. 201980035478.9.

* cited by examiner

Immediately
After Application

During Drying

After Drying

LITHIUM ION SECONDARY BATTERY AND METHOD FOR PRODUCING SAME

TECHNICAL FIELD

The present invention relates to a lithium ion secondary battery and a method for producing the same.

BACKGROUND ART

A secondary battery used for, for example, in-vehicle use includes a lithium ion secondary battery produced by interposing a film-shaped separator between a positive electrode and a negative electrode and laminating or winding them. The positive electrode and the negative electrode are manufactured by applying mixture layers on both surfaces of electrode foils and performing drying and pressing. The separator is a porous film and manufactured by extending a sheet-shaped resin. The positive electrode and the negative electrode have roles of charge and discharge, and the separator has a role of electrically insulating the positive electrode from the negative electrode.

As described above, since the separator is the porous film made of resin, when an internal short-circuit occurs due to a foreign matter, nailing from outside, and the like, heat is generated to melt the separator, and a spread of a region where the internal short-circuit occurs further generates heat, thus being not preferable.

Therefore, there has been a proposed formation of an insulating layer made of inorganic filler on a mixture layer of a positive electrode or a negative electrode to avoid an increase in region where internal short-circuit occurs even when the separator thus melts and disappears (Patent Literature 1). The insulating layer is made of inorganic filler and therefore does not melt through heat generation. Even when the heat generation melts the separator, the insulating layer can avoid the increase in region where the internal short-circuit occurs in the positive and negative electrodes.

CITATION LIST

Patent Literature

Patent Literature 1: Japanese Patent No. 5112853

SUMMARY OF INVENTION

Technical Problem

An insulating layer formed on a mixture layer obstructs a passage through which an electrolyte moves to the mixture layer (liquid permeability is decreased). While a battery responsiveness is determined by a Li-ion amount in the electrolyte entering and exiting an active material of the positive electrode or the negative electrode, the decreased liquid permeability of the electrolyte as described above decreases a replaceability (replacement of the electrolyte after reaction with the electrolyte before reaction) of the electrolyte in the proximity of the active material of the positive electrode or the negative electrode. Thus, the Li-ion concentration is not kept constant to decrease the amount of entering and exiting of the Li-ion. As a result, there is a problem in that the battery responsiveness is deteriorated, a resistance indicating battery performance increases, and an output decreases.

Therefore, it is an object of the present invention to provide a lithium ion secondary battery that ensures a replaceability of an electrolyte in the proximity of an active material and is excellent in output and responsiveness, and a method for manufacturing the same.

Solution to Problem

The inventor found that the above-described problem was solved by providing holes (puddles) in an interface between an insulating layer and a mixture layer in a lithium ion secondary battery that included the insulating layer on the mixture layer. Thus, the inventor completed the invention. That is, the lithium ion secondary battery of the present invention comprises an electrode that includes an electrode foil, a mixture layer disposed on a surface of the electrode foil, and an insulating layer disposed on a surface of the mixture layer. The insulating layer contains ceramic particles. On the surface of the mixture layer facing a border between the insulating layer and the mixture layer, a plurality of holes having diameters of 2.5 μm or more are provided.

The description encompasses a content disclosed in Japanese Patent Application No. 2018-116217 forming a basis for priority of this application.

Advantageous Effects of Invention

According to the present invention, even when the insulating layer is formed on the mixture layer, the holes (puddles) provided in the surface of the mixture layer play a role of a buffer that stores the fresh (before reaction) electrolyte, thereby ensuring keeping the Li-ion concentration of the electrolyte in the proximity of the active material constant. Consequently, the lithium ion secondary battery excellent in output and responsiveness can be provided. Problems, configurations, and effects other than ones described above will be clarified in the following explanation of embodiments.

DESCRIPTION OF EMBODIMENTS

The following describes an embodiment of a lithium ion secondary battery according to the present invention with reference to the drawings.

Figure 1:
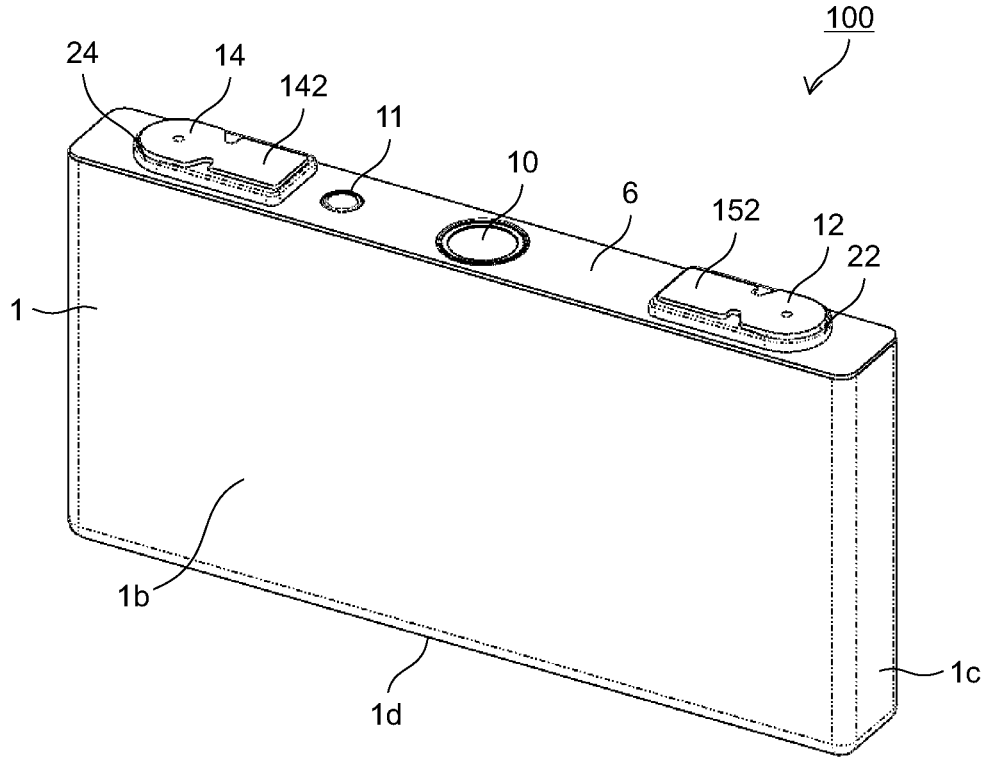
FIG. 1 is an external perspective view of a square secondary battery according to one embodiment of the present invention.
Figure 2:
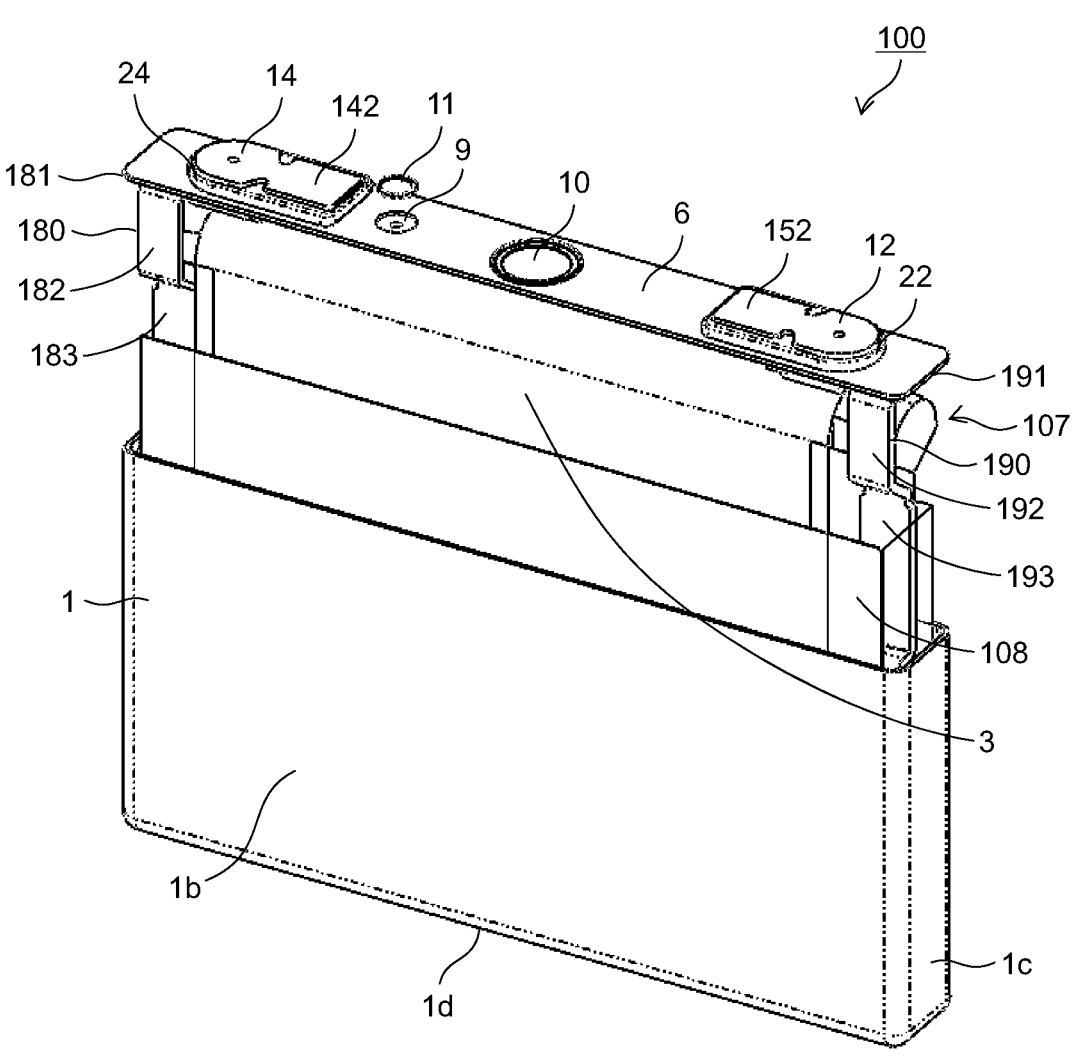
FIG. 2 is an exploded perspective view of the square secondary battery.
Figure 3:
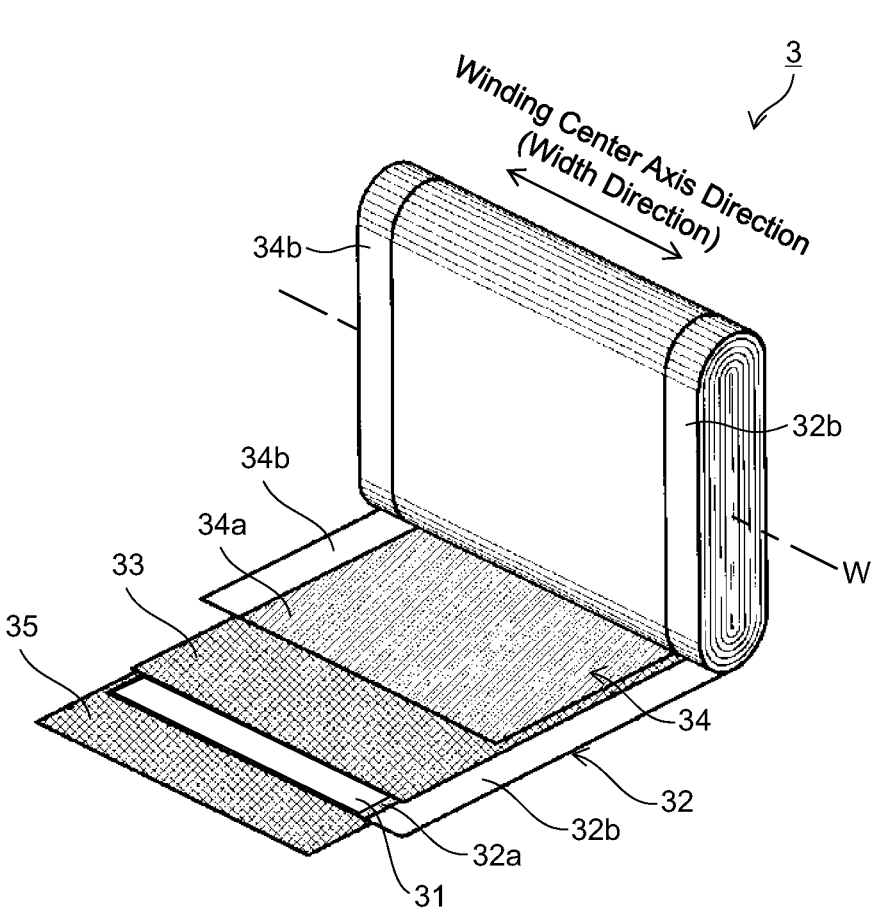
FIG. 3 is a developed perspective view of a wound group housed in a battery can of the square secondary battery.

FIG. 1 is an external perspective view of a square secondary battery 100 as one embodiment of the lithium ion secondary battery according to the present invention, and FIG. 2 is an exploded perspective view illustrating a configuration of the square secondary battery 100. FIG. 3 is a developed perspective view of a wound group 3 housed in a battery can 1 of the square secondary battery 100. While a case where a mixture layer and an insulating layer are disposed on a negative electrode foil as an electrode foil will be described in this embodiment, it should not be construed in a limiting sense. The mixture layer and the insulating layer may be disposed on a positive electrode foil, or the mixture layer and the insulating layer may be each disposed on both the negative electrode foil and the positive electrode foil.

As illustrated in FIG. 1, the square secondary battery 100 includes a battery container that includes the battery can 1 and a battery lid 6. A material of the battery can 1 and the battery lid 6 is aluminum, an aluminum alloy, or the like. In this embodiment, a deep drawing is performed to form the battery can 1 in a flat rectangular box shape having open one end. The battery can 1 includes a bottom surface 1d having a rectangular flat plate shape, a pair of wide-width side surfaces 1b disposed on a pair of respective long side portions of the bottom surface 1d, and a pair of narrow-width side surfaces 1c disposed on a pair of respective short side portions of the bottom surface 1d.

The battery lid 6 has a rectangular flat plate shape and is laser-welded so as to cover the opening of the battery can 1. That is, the battery lid 6 seals the opening of the battery can 1. In the battery lid 6, a positive electrode external terminal 14 and a negative electrode external terminal 12 electrically connected to a positive electrode 34 and a negative electrode 32 (see FIG. 3) of the wound group 3 are disposed. Note that a positive electrode side external insulator 24 and a negative electrode side external insulator 22 to avoid short circuit are disposed between the positive electrode external terminal 14 and the battery lid 6 and between the negative electrode external terminal 12 and the battery lid 6, respectively.

A flat plate-shaped busbar welding portion 142 and a flat plate-shaped busbar welding portion 152 are disposed on the positive electrode external terminal 14 and the negative electrode external terminal 12, respectively. When a battery pack is manufactured, by bringing busbars into abutment with the busbar welding portions 142 and 152 and performing welding, the busbar is connected to the positive electrode external terminal 14 and the busbar is connected to the negative electrode external terminal 12.

The battery lid 6 includes a gas discharge valve 10. The gas discharge valve 10 is formed by partially thinning the battery lid 6 through presswork. Note that a thin-walled member may be attached to the opening of the battery lid 6 by laser welding or the like to configure the thin-walled portion as a gas discharge valve. When the square secondary battery 100 generates heat due to abnormality, such as overcharge, to generate a gas and a pressure inside the battery container increases to reach a predetermined pressure, the gas discharge valve 10 ruptures and discharges the gas from the inside to reduce the pressure inside the battery container.

As illustrated in FIG. 2, the battery can 1 houses the wound group 3 (see FIG. 3) held to a lid assembly 107. The battery can 1 houses a positive electrode current collector 180 joined to the positive electrode 34 (see FIG. 3) in the wound group 3, a negative electrode current collector 190 joined to the negative electrode 32 (see FIG. 3) in the wound group 3, and the wound group 3 in a state covered with an insulating case 108. The material of the insulating case 108 is a resin having an insulating property, such as polypropylene, and the battery can 1 is electrically insulated from the wound group 3. The lid assembly 107 here means an integral assembly of the wound group 3, the positive electrode current collector 180, the positive electrode external terminal 14, the negative electrode current collector 190, the negative electrode external terminal 12, and the battery lid 6.

The positive electrode external terminal 14 is electrically connected to the positive electrode 34 (see FIG. 3) in the wound group 3 via the positive electrode current collector 180, and the negative electrode external terminal 12 is electrically connected to the negative electrode 32 (see FIG. 3) in the wound group 3 via the negative electrode current collector 190. In view of this, an electric power is supplied to an external device via the positive electrode external terminal 14 and the negative electrode external terminal 12, or an electric power generated outside is supplied to be charged to the wound group 3 via the positive electrode external terminal 14 and the negative electrode external terminal 12.

The positive electrode current collector 180 includes a seat portion 181 connected to the positive electrode external terminal 14, a joining planar portion 183 connected to the positive electrode 34, and a planar portion 182 disposed between the seat portion 181 and the joining planar portion 183.

Similarly to the positive electrode current collector 180, the negative electrode current collector 190 has a structure including a seat portion 191 connected to the negative electrode external terminal 12, a joining planar portion 193 connected to the negative electrode 32, and a planar portion 192 disposed between the seat portion 191 and the joining planar portion 193.

As illustrated in FIG. 2, a liquid injection hole 9 for injecting an electrolyte into the battery container is drilled in the battery lid 6. The liquid injection hole 9 is sealed with a liquid injection plug 11 after having injected the electrolyte. As the electrolyte, for example, a nonaqueous electrolyte produced by dissolving a lithium salt, such as lithium hexafluorophosphate (LiPF$_6$), in a carbonate ester-based organic solvent, such as ethylene carbonate, can be used. The composition of the electrolyte is not specifically limited.

With reference to FIG. 3, the wound group 3 will be described. FIG. 3 is a perspective view illustrating the wound group 3 and illustrating a state where a winding end side of the wound group 3 is developed. The wound group 3 as a power generating element has a laminated structure formed by winding the elongated positive electrode 34 and negative electrode 32 around the winding center axis W in a flat shape while interposing separators 33 and 35.

The positive electrode 34 includes a positive electrode mixture layer 34a formed by applying a positive electrode mixture layer slurry over both surfaces of the positive electrode foil as the positive electrode current collector and drying it, and a positive electrode foil exposed portion 34*b*, over which the positive electrode mixture layer slurry is not applied, is disposed in an end portion on one side in the width direction of the positive electrode foil.

The negative electrode 32 includes a negative electrode mixture layer 32*a* formed by applying a negative electrode mixture layer slurry over both surfaces of the negative electrode foil as the negative electrode current collector and drying it, and a negative electrode foil exposed portion 32*b*, over which the negative electrode mixture layer slurry is not applied, is disposed in an end portion on one side in the width direction of the negative electrode foil. An insulating layer 31 containing ceramic particles is disposed over the negative electrode mixture layer 32*a* and a part of the negative electrode foil exposed portion 32*b*.

The positive electrode foil exposed portion 34*b* and the negative electrode foil exposed portion 32*b* are regions where metal surfaces of the electrode foils are exposed and wound so as to be disposed at respective positions on one side and the other side in the winding center axis W direction (width direction in FIG. 3).

Figure 4:
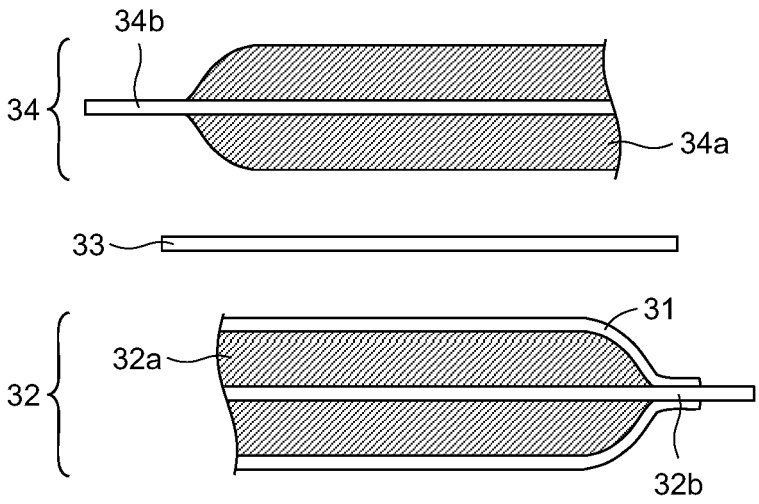
FIG. 4 is a cross-sectional view in a short width direction of the wound group.

FIG. 4 schematically illustrates a cross-sectional surface in a short width direction of the wound group 3 in which the positive electrode 34, the separator 33, and the negative electrode 32 are laminated. The positive electrode 34 includes the positive electrode mixture layer 34*a* formed on both surfaces of the positive electrode foil, and includes the positive electrode foil exposed portion 34*b* in one end portion. The negative electrode 32 includes the negative electrode mixture layer 32*a* formed on both surfaces of the negative electrode foil, and includes the negative electrode foil exposed portion 32*b* in one end portion. The insulating layer 31 is formed over the negative electrode mixture layer 32*a* and a part of the negative electrode foil exposed portion 32*b*. The separator 33 is interposed between the positive electrode 34 and the negative electrode 32.

Figure 5:
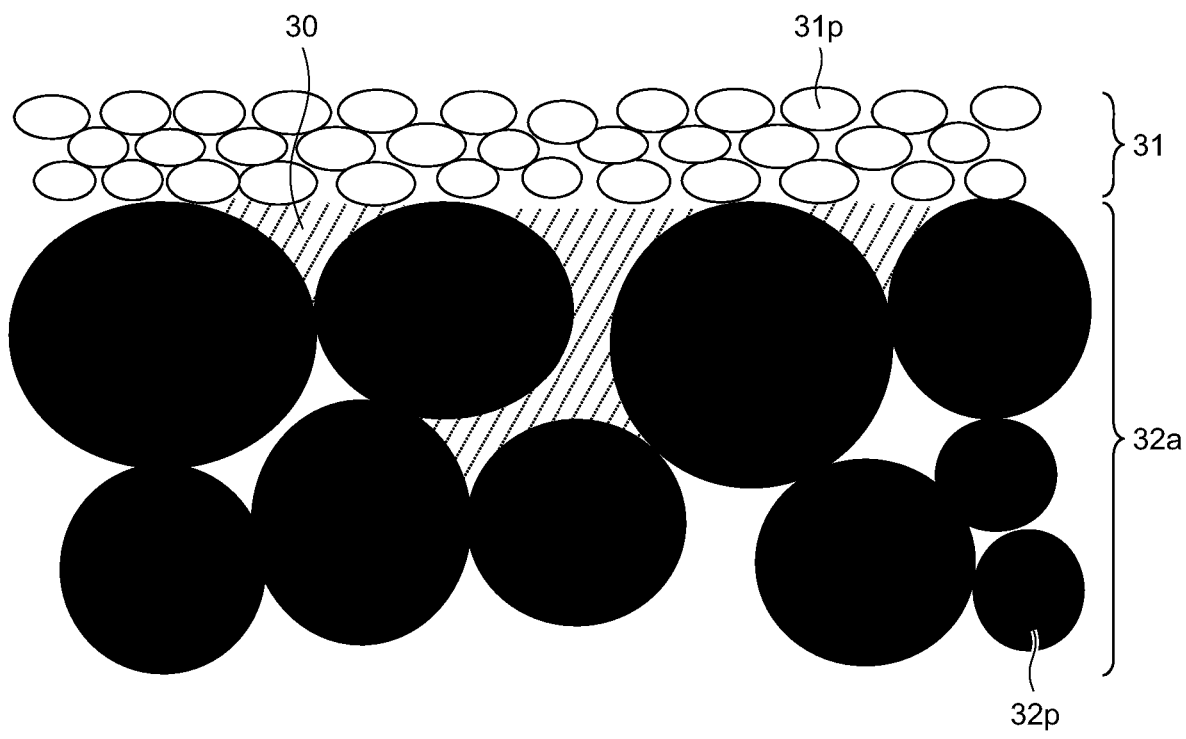
FIG. 5 is a cross-sectional view of a proximity of a surface of a negative electrode mixture layer.

FIG. 5 schematically illustrates a cross-sectional surface near the surface of the negative electrode mixture layer 32*a*. The negative electrode mixture layer 32*a* is formed by laminating negative electrode active material particles 32*p* and other particulate matters containing one or more selected from conductive materials and binders (not illustrated). The insulating layer 31 is formed by laminating ceramic particles 31*p*. The thickness of the insulating layer 31 is preferably in a range of 1 μm or more and 10 μm or less while not limited to this. Here, in a surface of the negative electrode mixture layer 32*a* facing a border between the negative electrode mixture layer 32*a* and the insulating layer 31, a plurality of holes 30 are provided. Specifically, the plurality of holes 30 are formed so as to be surrounded by a plurality of particulate matters, such as the negative electrode active material particles 32*p*, and the insulating layer 31 (hatched portion in FIG. 5).

The hole 30 functions as a puddle that holds the electrolyte to allow keeping a Li-ion concentration in the proximity of the negative electrode active material particles 32*p* constant, thereby ensuring improvement of the output and the responsiveness of the lithium ion secondary battery. In this embodiment, to provide the effect of the improved output and responsiveness, it is necessary to provide a plurality of holes having the diameter of 2.5 μm or more. Here, the hole 30 means a void portion formed on the surface of the negative electrode mixture layer 32*a* opening toward the interface between the negative electrode mixture layer 32*a* and the insulating layer 31 in a scanning electron microscope (SEM) image of a cross-sectional surface of a laminated body of the negative electrode mixture layer 32*a* and the insulating layer 31. The diameter of the hole 30 means a diameter of a circle circumscribing the hole 30 similarly in the SEM image of the cross-sectional surface. Furthermore, "to provide a plurality of holes having the diameter of 2.5 μm or more" means that a plurality of holes having the diameter of 2.5 μm or more are present on a straight line having a length of 100 μm along the interface between the negative electrode mixture layer 32*a* and the insulating layer 31 similarly in the SEM image of the cross-sectional surface.

The diameter of the hole 30 is preferably 0.5 times or more of the thickness of the insulating layer 31. Accordingly, a large amount of electrolyte exceeding the amount of the electrolyte held by the insulating layer 31 can be held by the holes 30, thereby ensuring maximally providing the buffer function of the holes 30. Here, the diameter of the hole 30 compared with the thickness of the insulating layer 31 means an average value of the diameters of the plurality of holes 30 having the diameter of 2.5 μm or more present on a straight line having a length of 100 μm along the interface between the negative electrode mixture layer 32*a* and the insulating layer 31 in a scanning electron microscope (SEM) image of a cross-sectional surface of the laminated body of the negative electrode mixture layer 32*a* and the insulating layer 31.

Furthermore, an opening width of the hole 30 on the surface of the negative electrode mixture layer 32*a* is preferably equal to or more than a particle diameter of the ceramic particle 31*p*. The ceramic particles 31*p* mutually bind to form bridges on the negative electrode mixture layer 32*a*, and the holes 30 are formed adjacent to the bridge portions. Therefore, the opening width of the hole 30 equal to or more than the particle diameter of the ceramic particle 31*p* forms the hole 30 having the sufficient size. The particle diameter of the ceramic particle here means a value of a median diameter in a particle size distribution (volume basis) obtained by a measurement using a laser diffraction particle size analyzer. The opening width of the hole 30 means an average value of the widths of the holes 30 opening toward the interface relating to all the holes 30 having the diameter of 2.5 μm or more present on a straight line having a length of 100 μm along the interface between the negative electrode mixture layer 32*a* and the insulating layer 31 in a scanning electron microscope (SEM) image of a cross-sectional surface of the laminated body of the negative electrode mixture layer 32*a* and the insulating layer 31.

Figure 6:
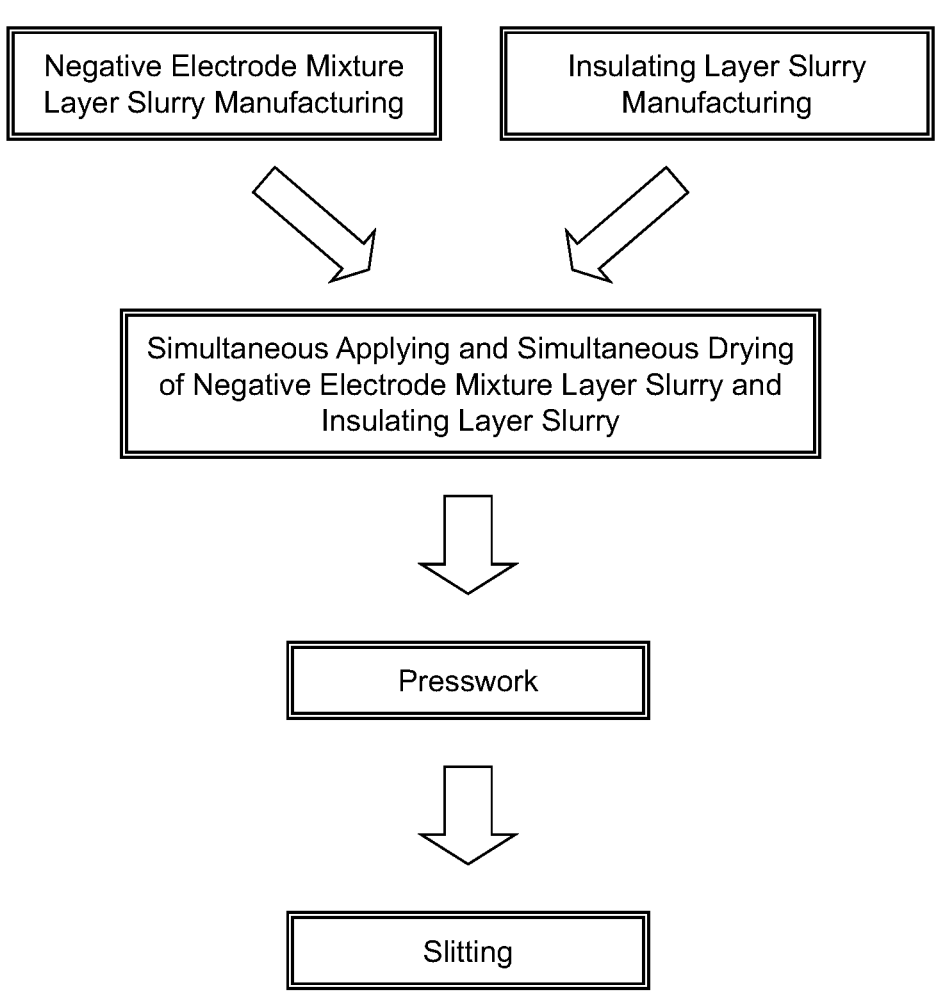
FIG. 6 is a drawing illustrating a manufacturing process of the negative electrode.

Next, a method for manufacturing the lithium ion secondary battery according to the embodiment will be described. FIG. 6 illustrates a manufacturing process of the negative electrode 32.

For the negative electrode mixture layer slurry, for example, 10 parts by weight of polyvinylidene fluoride (hereinafter referred to as PVDF) as a binder is added to 100 parts by weight of an amorphous carbon powder as a negative electrode active material, and N-methyl-2-pyrrolidone (hereinafter referred to as NMP) as a first solvent is added thereto and mixing it. Thus, the negative electrode mixture layer slurry can be prepared. While the case of using the amorphous carbon as the negative electrode active material has been described, the material is not limited to this. Natural graphite, various kinds of artificial graphite materials, a carbonaceous material, such as coke, a compound of Si, Sn, and the like (for example, SiO and $TiSi_2$), or a composite material of these substances into which lithium ions can be intercalated or from which lithium ions can be desorbed may be used. Their particle shapes include a scaly shape, a spherical shape, a fiber shape, a lump shape, and the like, and the shapes are not especially limited. When various kinds of graphite are especially used as the negative electrode active material and in the similar case, water or a mixture of water and the NMP is selectable as the first solvent in addition to the NMP, thus ensuring reduction in environmental load. An example of aqueous negative electrode mixture layer slurry includes a negative electrode mixture layer slurry produced by adding 1 part by weight of styrene-butadiene rubber (hereinafter, SBR) as a binder and 1 part by weight of carboxymethylcellulose sodium (hereinafter, CMC) as a thickening agent to 100 parts by weight of natural graphite powder.

For the insulating layer slurry, for example, 3 parts by weight of SBR as a binder is added to 100 parts by weight of alumina as ceramic particles, and a solvent having a boiling point equal to or less than a boiling point of the first solvent is used as a second solvent to it. Preferably, the boiling point of the second solvent is less than the boiling point of the first solvent, and for example, preferably lower than the boiling point of the first solvent by 10° C. or more. The boiling point has a correlation with a steam pressure. Accordingly, as described later, the drying behaviors of the first solvent and the second solvent are mutually different, and the holes are easily formed on the surface of the negative electrode mixture layer. Specifically, the example of the second solvent includes an alcohol-based solvent, a ketone-based solvent, a mixture thereof, a mixture of those and water, or water. The alcohol-based solvent includes methanol, ethanol, isopropanol, or the like, and the ketone-based solvent includes acetone, methyl ethyl ketone, or the like.

The insulating layer slurry can be prepared by mixing using the second solvent. While the case where alumina ($Al_2O_3$) is used as the ceramic particles is described above, this should not be construed in a limiting sense. For example, the one or more of ceramic particles selected from silica, zirconia ($ZrO_2$), magnesia (MgO), lithium carbonate, boehmite ($Al_2O_3 \cdot H_2O$), and the like may be used, and their particle shapes are not especially limited while including a plate shape, a scaly shape, a spherical shape, a fiber shape, a lump shape, and the like. Especially, when the ceramic particles have the plate shapes, the bridges are formed on the surface of the mixture layer when the ceramic particles mutually bind to form the insulating layer. This is preferable because the holes having the sufficient sizes can be formed without the ceramic particles falling into the holes. Here, having the plate shapes means that the ceramic particles having the thicknesses of 0.5 μm to 2 μm and their major axes of 1 μm to 5 μm are included by 90 mass % or more of in whole.

When the particle diameters of the ceramic particles are excessively small, the ceramic particles easily fall into the holes on the surface of the negative electrode mixture layer due to a capillarity to make the formation of the holes having the appropriate sizes difficult in some cases. Meanwhile, in the case of excessively large, the function as the insulating layer is impaired in some cases while the falling into the holes due to the capillarity does not occur. Therefore, the particle diameters of the ceramic particles are appropriately set considering them. For example, the particle diameters of the ceramic particles are preferably in a range of 0.5 μm or more and 3.0 μm or less. Here, the particle diameter means a value of a median diameter in a particle size distribution (volume basis) obtained by a measurement using a laser diffraction particle size analyzer.

While the case where 3 parts by weight of the SBR as the binder is added is described above, since the binder generally interferes with ion movements that occur in the reactions in the positive electrode and the negative electrode, the additive amount is preferably a less amount and not specifically limited. The negative electrode mixture layer slurry and the insulating layer slurry are applied over the negative electrode foil, such as a copper foil, and dried to form the negative electrode mixture layer 32a and the insulating layer 31 in accordance with the manufacturing process illustrated in FIG. 6, thus manufacturing the negative electrode 32.

Figure 7:
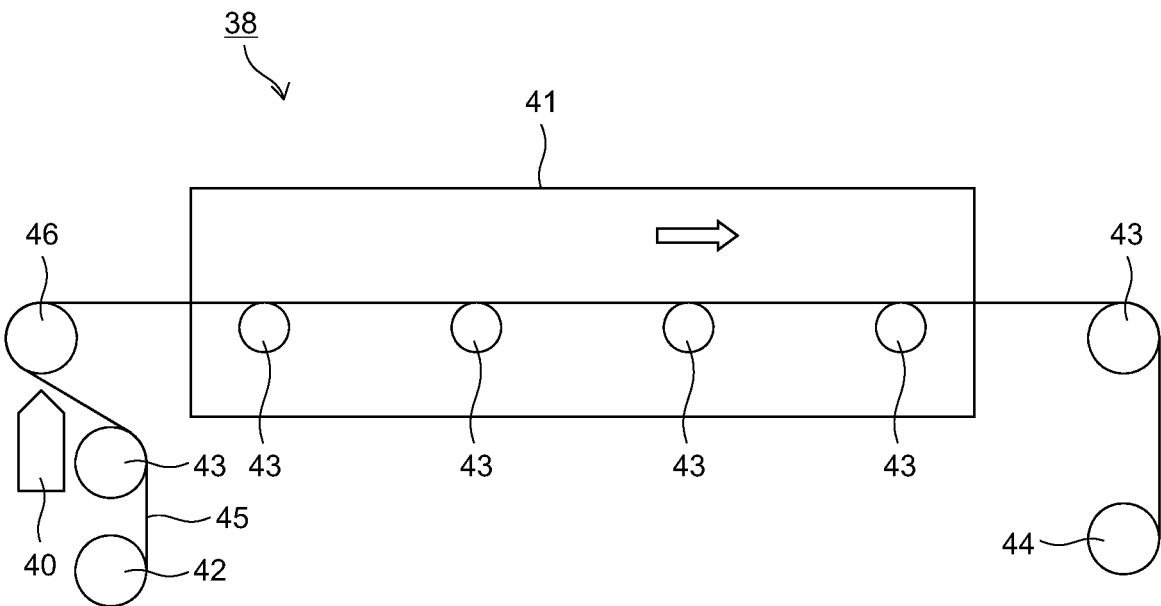
FIG. 7 is a drawing illustrating an applying and drying step of a negative electrode mixture layer slurry and an insulating layer slurry.

Next, the applying and drying step of the negative electrode mixture layer slurry and the insulating layer slurry will be described based on FIG. 7. A coating dryer 38 illustrated in FIG. 7 includes a die head 40 and a back roller 46 to apply each slurry and a drying furnace 41 to volatilize and dry solvent during coating. Additionally, conveyance rollers 43 are disposed to sequentially convey a negative electrode foil 45 of a copper foil or the like to the applying step portion and the drying step portion in the coating dryer 38. An unwind roller 42 and a roll-up roller 44 are each disposed to unwind and roll up the negative electrode foil 45. The negative electrode foil 45 of a copper foil or the like is conveyed along the conveyance rollers 43 from the unwind roller 42.

Over the negative electrode foil 45, the negative electrode mixture layer slurry is applied with the thickness of 50 μm to 200 μm, and the insulating layer slurry is applied thereover with the thickness of 2 μm to 20 μm. Subsequently, through the conveyance to the drying furnace 41, the solvent components in the negative electrode mixture layer slurry and the insulating layer slurry are volatilized and dried by circulating hot wind at 60 to 100° C., thus forming the negative electrode mixture layer 32a and the insulating layer 31. The respective film thicknesses after the drying are reduced to about the halves. After the drying, the roll-up roller 44 rolls up it with the negative electrode foil 45 in a roll shape. The rolled-up roll is again conveyed from the unwind roller 42, and the back surface is similarly formed to manufacture the negative electrode 32.

Figure 8:
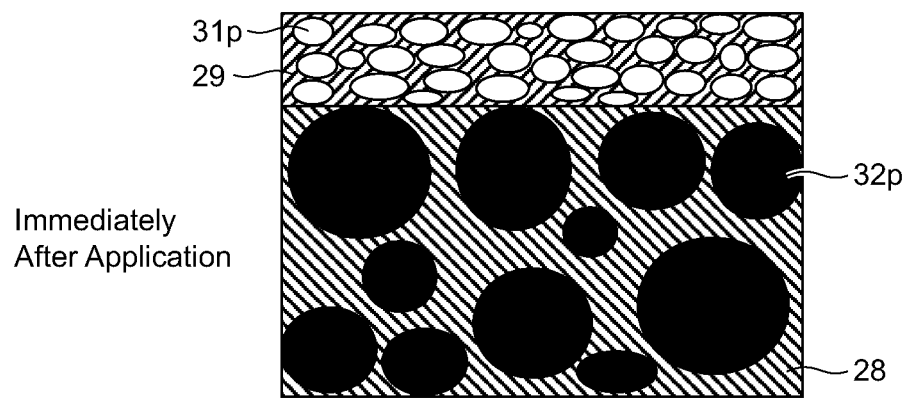
FIG. 8 is a drawing for describing a drying behavior after applying the negative electrode mixture layer slurry and the insulating layer slurry.
Figure 8:
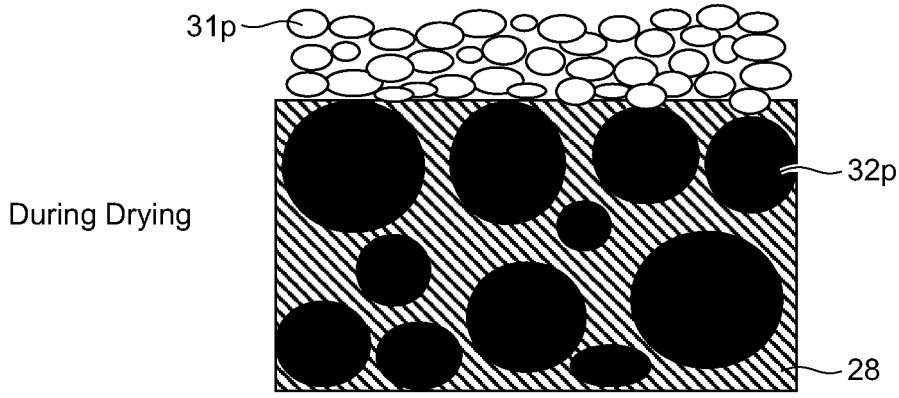
Figure 8:
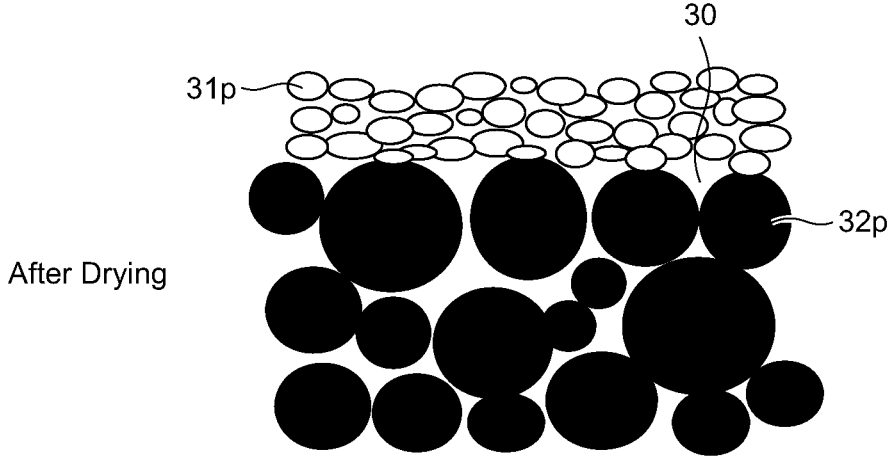

Here, the drying behavior after applying the negative electrode mixture layer slurry and the insulating layer slurry will be described based on FIG. 8. Immediately after the applying (before drying), the applied negative electrode mixture layer slurry and insulating layer slurry include a first solvent 28 and a second solvent 29, respectively. In the respective dispersing solvents, the particulate matter, such as the negative electrode active material particles 32p, and the ceramic particle 31p are dispersedly present. When the drying starts, the second solvent 29, whose boiling point is low and therefore the steam pressure having correlation with the boiling point is small, in the insulating layer slurry on the outermost surface volatilizes at first. By the volatilization of the second solvent 29, the ceramic particles 31p are mutually secured by the binder. When the drying further proceeds, the first solvent 28 in the negative electrode mixture layer slurry volatilizes. At this time, since the ceramic particles 31p are mutually secured to form the bridges on the outermost surface of the negative electrode mixture layer, the ceramic particles 31p do not fall into the voids of the particulate matters, such as the negative electrode active material particles 32p. Consequently, as illustrated in FIG. 8 (after drying), the holes 30 are formed in the voids of the negative electrode active material particles 32p on the outermost surface of the negative electrode mixture layer.

Figure 9:
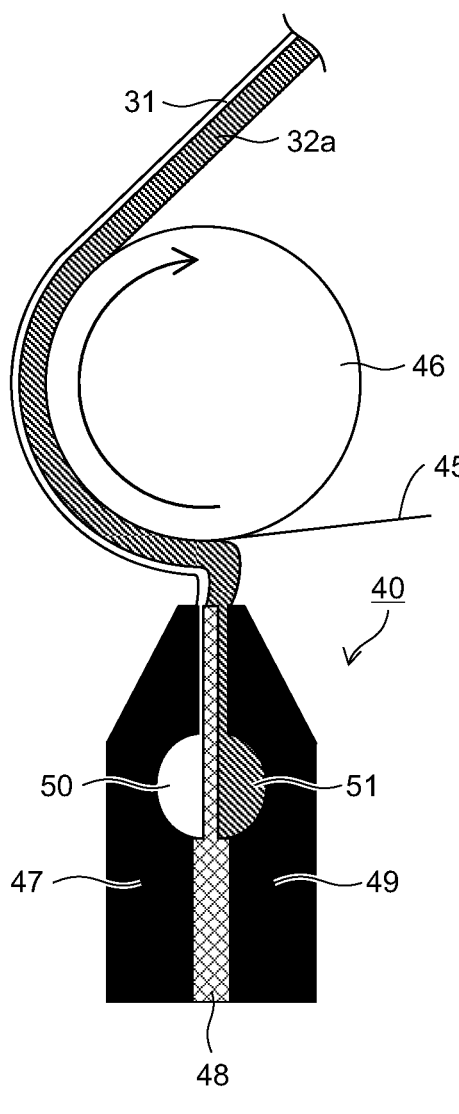
FIG. 9 is an enlarged view of a die head and back roller portion in FIG. 7.

The step of applying the negative electrode mixture layer slurry and the insulating layer slurry over the negative electrode foil will be described based on FIG. 9. FIG. 9 is a schematically enlarged view of the die head 40 and the back roller 46 portion in FIG. 7. The die head 40 includes an outlet-side block 47, a three-dimensional shim 48, and an inlet-side block 49, and internally includes an insulating layer slurry manifold 50 and a negative electrode mixture layer slurry manifold 51. The two kinds of slurries are vertically discharged from the respective manifolds toward the negative electrode foil 45 at the same time, thereby performing a simultaneous applying of the two layers.

Figure 10:
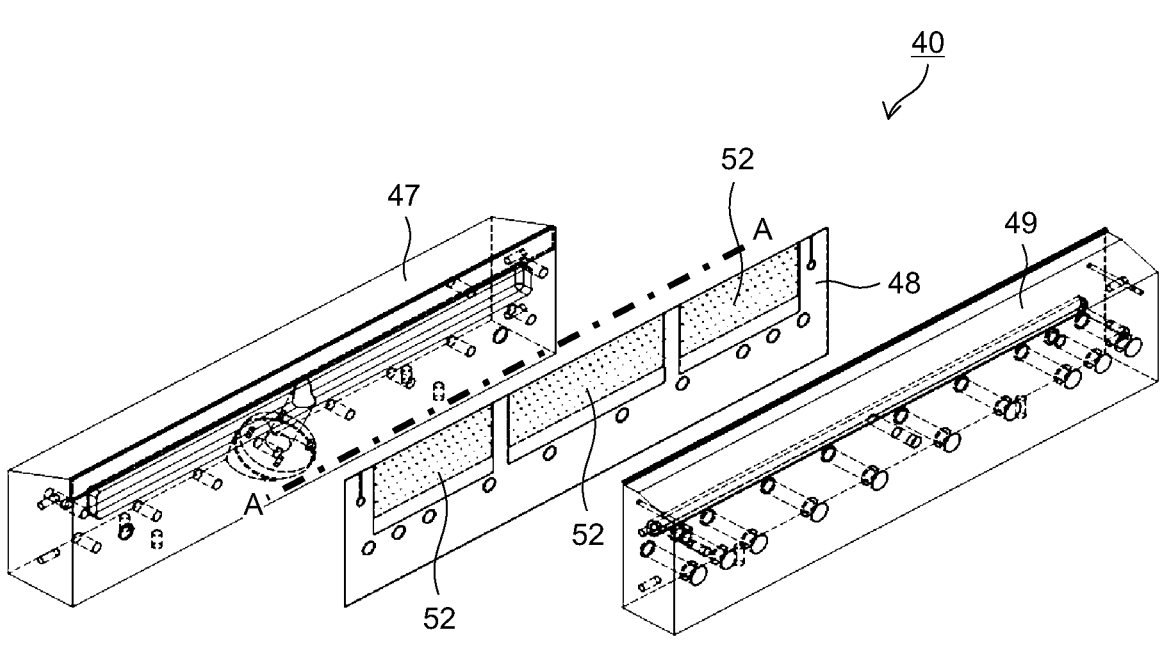
FIG. 10 is a developed drawing of the die head.

FIG. 10 is a developed drawing of the die head 40. The three-dimensional shim 48 is interposed between the outlet-side block 47 and the inlet-side block 49, and grooves 52 as flow passages of the slurries are formed on both surfaces of the three-dimensional shim 48. Thus, the die head 40 includes the flow passages configured to apply the two kinds of slurries, the negative electrode mixture layer slurry and the insulating layer slurry, and simultaneously forms the negative electrode mixture layer 32*a* and the insulating layer 31 on the negative electrode foil 45 by simultaneously discharging those slurries.

While viscosities of the negative electrode mixture layer slurry and the insulating layer slurry in the applying are not specifically limited, for the insulating layer slurry, an excessively low viscosity causes the insulating layer slurry to easily fill the voids of the negative electrode active material particles 32*p*, thus making the hole formation difficult. Therefore, the viscosity is preferably high to some extent. Specifically, the viscosity at 25° C. is preferably 300 mPa·s or more, and more preferably 500 mPa·s or more.

After the applying and drying, a presswork is performed by a roll press machine. Specifically, the laminated body in which the negative electrode mixture layer and the insulating layer are formed on the negative electrode foil is sandwiched between rollers heated to 60 to 120° C. and a pressure is applied, thus performing the presswork. After the presswork, slitting is performed to have a predetermined width, thereby ensuring obtaining the negative electrode 32 as illustrated in FIG. 3.

Figure 11:
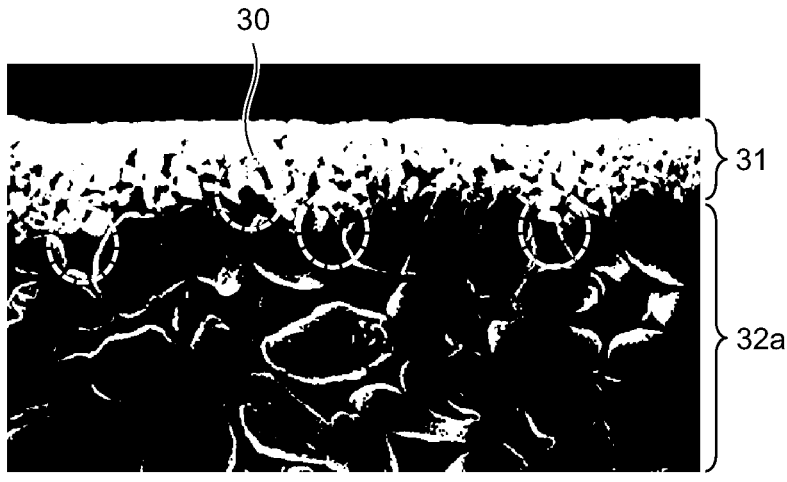
FIG. 11 is a scanning electron microscope (SEM) image of a cross-sectional surface of the negative electrode mixture layer and the insulating layer formed in accordance with the manufacturing method according to the embodiment.
Figure 12:
FIG. 12 is a scanning electron microscope (SEM) image of a cross-sectional surface of a negative electrode mixture layer and an insulating layer formed in accordance with a method other than the manufacturing method according to the embodiment.

FIG. 11 illustrates a scanning electron microscope (SEM) image of a cross-sectional surface of the negative electrode mixture layer and the insulating layer formed in accordance with the manufacturing method according to the embodiment. In FIG. 11, it was confirmed that the thickness of the insulating layer 31 was 4 μm and a plurality of holes 30 having the diameters of 2.5 μm were formed on the surface of the negative electrode mixture layer 32*a* facing the border between the insulating layer 31 and the negative electrode mixture layer 32*a*. In contrast, FIG. 12 illustrates a cross-sectional surface when the negative electrode mixture layer slurry is applied and dried to form the negative electrode mixture layer 32*a*, and subsequently, the insulating layer slurry is applied thereon and dried to form the insulating layer 31. In FIG. 12, the ceramic particles included in the insulating layer 31 invade between the negative electrode active material particles due to the capillarity in the negative electrode mixture layer 32*a*, resulting in a state where the voids of the negative electrode active material particles are clogged with the ceramic particles. The distances in the lateral direction in FIG. 11 and FIG. 12 are 200 μm.

For the positive electrode 34, for example, 10 parts by weight of scaly graphite as a conductive material and 10 parts by weight of PVDF as a binder are added to 100 parts by weight of lithium manganate (chemical formula: $LiMn_2O_4$) as a positive electrode active material, and NMP as a dispersing solvent is added thereto and mixing it. Thus, the positive electrode mixture layer slurry is prepared, and this positive electrode mixture layer slurry is applied over both surfaces of the aluminum foil (positive electrode foil) excluding the weld portion (positive electrode foil exposed portion 34*b*) and dried. Subsequently, through the presswork and the slitting step similarly to the negative electrode described above, the positive electrode 34 as illustrated in FIG. 3 in which the thickness of the positive electrode mixture layer excluding the aluminum foil is 100 μm to 200 μm can be obtained.

While the case of using lithium manganite as the positive electrode active material is described above, another lithium manganate having a spinel crystal structure, a lithium manganese composite oxide partially replaced by or doped with a metallic element, a lithium cobaltate or a lithium titanate having a layered crystal structure, or a lithium-metal composite oxide produced by replacing or doping a part of these substances by/with a metallic element may be used.

While the embodiment has described the case of using the PVDF as a binder of the mixture layer in the positive electrode 34 and the negative electrode 32, for example, a polymer, such as polytetrafluoroethylene (PTFE), polyethylene, polystyrene, polybutadiene, butyl rubber, nitrile rubber, styrene-butadiene rubber, polysulfide rubber, nitrocellulose, cyanoethyl cellulose, various kinds of latexes, acrylonitrile, vinyl fluoride, vinylidene fluoride, propylene fluoride, chloroprene fluoride, and acrylic-based resin, and a mixture of these substances may be used.

Among both end portions in the width direction of the wound group 3, that is, in the winding center axis W direction perpendicular to the winding direction, one is configured as the laminated portion of the positive electrode 34, and the other is configured as the laminated portion of the negative electrode 32. In the laminated portion of the positive electrode 34 disposed on the one end, the positive electrode foil exposed portion 34*b* where the positive electrode mixture layer 34*a* is not formed is laminated. In the laminated portion of the negative electrode 32 disposed on the other end, the negative electrode foil exposed portion 32*b* where the negative electrode mixture layer 32*a* is not formed is laminated. The laminated portion of the positive electrode foil exposed portion 34*b* and the laminated portion of the negative electrode foil exposed portion 32*b* are each preliminarily squashed and connected to the positive electrode current collector 180 and the negative electrode current collector 190, respectively by ultrasonic joining, and the obtained lid assembly 107 is housed in the battery can 1, thus ensuring the manufacture of the lithium ion secondary battery.

According to the manufacturing method of this embodiment, the electrode structure that includes the holes (puddles) in the interface between the insulating layer and the mixture layer can be obtained, and the lithium ion secondary battery excellent in output and responsiveness can be provided.

While the embodiment of the present invention has been described in detail, the specific configuration is not limited to the embodiment. Design changes and the like within a scope not departing from the gist of the present invention are included in the present invention.

REFERENCE SIGNS LIST

1 Battery can
1*b* Wide-width side surface
1*c* Narrow-width side surface
1*d* Bottom surface
3 Wound group
6 Battery lid
9 Liquid injection hole
10 Gas discharge valve
11 Liquid injection plug 12 Negative electrode external terminal
14 Positive electrode external terminal
22 Negative electrode side external insulator
24 Positive electrode side external insulator
28 First solvent
29 Second solvent
30 Hole
31 Insulating layer
31*p* Ceramic particle
32 Negative electrode
32*a* Negative electrode mixture layer
32*b* Negative electrode foil exposed portion
32*p* Negative electrode active material particle
33 Separator
34 Positive electrode
34*a* Positive electrode mixture layer
34*b* Positive electrode foil exposed portion
35 Separator
38 Coating dryer
40 Die head
41 Drying furnace
42 Unwind roller
43 Conveyance roller
44 Roll-up roller
45 Negative electrode foil
46 Back roller
47 Outlet-side block
48 Three-dimensional shim
49 Inlet-side block
50 Insulating layer slurry manifold
51 Negative electrode mixture layer slurry manifold
52 Groove
100 Square secondary battery
107 Lid assembly
108 Insulating case
142 Busbar welding portion
152 Busbar welding portion
180 Positive electrode current collector
181 Seat portion
182 Planar portion
183 Joining planar portion
190 Negative electrode current collector
191 Seat portion
192 Planar portion
193 Joining planar portion Every published material, patent, and patent application referred in this description are incorporated herein directly by reference.

The invention claimed is:

1. A lithium ion secondary battery comprising
an electrode that includes:
an electrode foil;
a mixture layer disposed on a surface of the electrode foil that contains active material particles; and
an insulating layer disposed on a surface of the mixture layer, the insulating layer containing ceramic particles,
wherein, on the surface of the mixture layer facing a border between the insulating layer and the mixture layer, a plurality of holes having diameters of 2.5 μm or more are provided so as to be surrounded by the active material particles and the insulating layer, and
wherein the plurality of the holes are present on a straight line having a length of 100 μm along the border between the insulating layer and the mixture layer in a scanning electron microscope (SEM) image of a cross-sectional surface of the mixture layer and the insulating layer.

2. The lithium ion secondary battery according to claim 1, wherein the insulating layer has a thickness of 1 μm or more and 10 μm or less.
3. The lithium ion secondary battery according to claim 1, wherein the holes have diameters of 0.5 times or more of a thickness of the insulating layer.
4. The lithium ion secondary battery according to claim 1, wherein the holes have opening widths on the surface of the mixture layer equal to or more than particle diameters of the ceramic particles.
5. The lithium ion secondary battery according to claim 1, wherein the particle diameters of the ceramic particles are 0.5 μm or more and 3.0 μm or less.
6. The lithium ion secondary battery according to claim 1, wherein the ceramic particles are one or more selected from alumina, boehmite, magnesia, and zirconia.
7. The lithium ion secondary battery according to claim 1, wherein the ceramic particles are plate-shaped particles.
8. A method for manufacturing the lithium ion secondary battery according to claim 1, the method comprising:
a simultaneously applying step of simultaneously applying a mixture layer slurry and an insulating layer slurry over the electrode foil, the mixture layer slurry containing a first solvent, and ceramic particles being dispersed in a second solvent in the insulating layer slurry; and
a drying step of drying the applied mixture layer slurry and the insulating layer slurry and forming the mixture layer and the insulating layer to manufacture the electrode,
wherein the second solvent has a boiling point equal to or less than a boiling point of the first solvent.
9. The method for manufacturing the lithium ion secondary battery according to claim 8,
wherein the first solvent is water and/or N-methyl-2-pyrrolidone, and
wherein the second solvent is an alcohol-based solvent, a ketone-based solvent, a mixture thereof, a mixture of those and water, or water.
10. The method for manufacturing the lithium ion secondary battery according to claim 8,
wherein a viscosity at 25° C. of the insulating layer slurry is 300 mPas or more.
11. The lithium ion secondary battery of claim 1, wherein the particle diameters of the ceramic particles are 0.5 μm or more and 3.0 μm or less and
wherein ceramic particles having a thicknesses of 0.5 μm to 2 μm and major axes of 1 μm to 5 μm comprise 90% of the mass of the ceramic particles.
12. The lithium ion secondary battery of claim 1, wherein the holes comprise void portions formed on the surface of the mixture layer opening toward an interface between the mixture layer and the insulating layer.
13. The lithium ion secondary battery of claim 12, wherein the electrode is a negative electrode.
14. The lithium ion secondary battery of claim 1, wherein respective particle diameters of the active material particles are larger than the ceramic particles.
15. A lithium ion secondary battery comprising
an electrode that includes:
an electrode foil;
a mixture layer disposed on a surface of the electrode foil that contains active material particles; and
an insulating layer disposed on a surface of the mixture layer, the insulating layer containing ceramic particles,
wherein:

on the surface of the mixture layer facing a border between the insulating layer and the mixture layer, a plurality of holes having diameters of 2.5 μm or more are provided so as to be surrounded by the active material particles and the insulating layer, and the particle diameters of the ceramic particles are 0.5 μm or more and 3.0 μm or less and ceramic particles having a thicknesses of 0.5 μm to 2 μm and major axes of 1 μm to 5 μm comprise 90% of the mass of the ceramic particles.

\* \* \* \* \*